March 15, 1932.　　　V. G. BLOEDE ET AL　　　1,849,786
PROCESS OF TREATING SEEDS TO REMOVE THE SEED COATS
AND TO SEPARATE OUT THE ENDOSPERMS
Filed Sept. 11, 1929
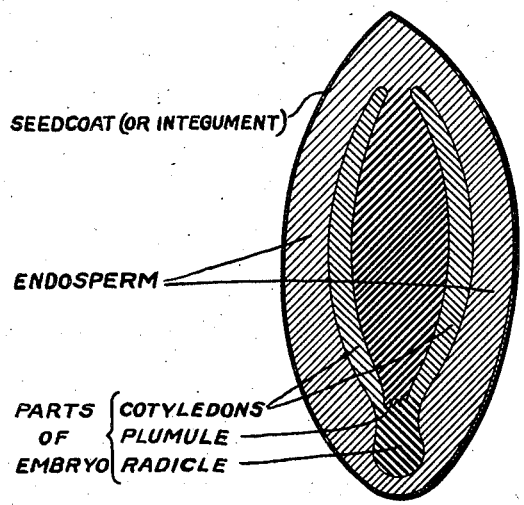
SEEDCOAT (OR INTEGUMENT)
ENDOSPERM
PARTS { COTYLEDONS
OF     { PLUMULE
EMBRYO { RADICLE
Inventors;
Victor G. Bloede,
Elmer L. Greensfelder, Patented Mar. 15, 1932

1,849,786

UNITED STATES PATENT OFFICE

VICTOR G. BLOEDE, OF CATONSVILLE, AND ELMER L. GREENSFELDER, OF BALTIMORE, MARYLAND, ASSIGNORS TO VICTOR G. BLOEDE COMPANY, OF BALTIMORE, MARYLAND, A CORPORATION

PROCESS OF TREATING SEEDS TO REMOVE THE SEED COATS AND TO SEPARATE OUT THE ENDOSPERMS

Application filed September 11, 1929. Serial No. 391,987.

This invention relates to a process of treating locust bean seeds (*Ceratonia siliqua*) and similar or botanically related seeds or kernels containing mucilaginous matter so as to separate therefrom the endosperms free from seed-coat or husk and embryos; these endosperms on extraction with water yielding gummy substances which have great practical value in the technical arts, such as in paper sizing, textile sizing, etc.

The seed, as it is originally obtained from the pod, is covered with a seed-coat or husk, and is horn-like, hard and resistant to shattering blows. It is very difficult to scrape off this husk or integument by ordinary means, and it is essential to remove this husk in order to produce or separate out the clean endosperms.

We have found that removal of the husk or seed-coat can be readily accomplished by treating the seeds with suitable chemicals, preferably mineral acids, such as sulphuric and hydrochloric acid, etc., which change the character of the husk, making it soft and loose so that it can be readily brushed, pulled or scraped off.

The seeds so treated are then washed with water and the acid still remaining is neutralized. The preferred subsequent steps are to brush off the softened husks, then let the dehusked seeds stand for a time so that they swell, the seed opening up so that the embryo is no longer completely in contact with the endosperm. The swollen seeds are then placed in a bran-duster device, consisting of a revolving drum covered with wire cloth and equipped with brushes, which break the embryo completely away from the endosperm. The next step is to dry the mixture of separated embryos and endosperms. The toughness and rigidity of the dried endosperms is greater than that of the dried embryos so that consequently when the mixture is subjected to a hammer-mill or other suitable grinding or granulating machine the endosperms remain unbroken whereas the embryos are shattered into small pieces, so that by sieving or aspiration the clean endosperms are then obtainable completely separated from the embryos.

As an instance of our process, we cite the following example:—140 pounds locust bean seeds, 105 pounds concentrated sulphuric acid (66° Beaumé) diluted with 70 pounds water are placed in an acid-proof receptacle. Live steam is blown into the mixture through a lead or acid-resistant pipe, raising the temperature gradually. The husk darkens, and the action is preferably to be stopped in about 15 minutes, the test being when a point is reached where the husk can be completely squeezed off from the seed by pressing the seed between the fingers or can be readily removed from the seed with the finger nail. The seeds are then promptly washed well in running water to remove the sulphuric acid and to prevent hydrolysis. All trace of acid is then removed by treating the dehusked seeds with a solution of soda ash, ammonia, or other suitable neutralizing agent. When complete neutralization of the mineral acid has been effected, then prefrably add acetic acid or other non-hydrolizing acid to bring back to the acid side, thus lightening the coloration that results from the presence of alkali.

The seeds are now placed in a trough-shaped sieve of sufficiently small mesh to prevent the seeds from going through it, yet of suitable mesh to allow of the husk going through the interstices when it is brushed off of the seeds. The husk is removed by brushes which revolve against the seeds in the presence of running water, the soft, broken-up husk being brushed away through the spaces in the sieve.

The water is then allowed to drain from the seeds, and the seeds so treated are allowed to remain standing damp for a while, preferably over night. This causes absorption of water and consequent swelling of the dehusked seeds, and, as has been previously described, the endosperms separate considerably and are no longer in complete contact with the embryos.

These swollen seeds are then broken apart by action of brushes in the bran-duster machine, which was previously described, or by rolls or other suitable device. By the action of the brushes or rolls, the endosperms are broken completely away from the embryos. These are then all dried and the mixed endosperms and embryos are subjected to a hammer-mill or other grinding or granulating machine which does not break up the dry endosperms due to their superior toughness, but breaks up the dry embryos into small pieces so that the embryo pieces are removable from the endosperms by sieving or aspiration.

An alternative method of separating out the endosperms from the embryos, which has the advantage of requiring no milling action, is to utilize the difference in specific gravities of the endosperms and the embryos. On introducing the mixed embryos and endosperms into a liquid or salt solution, such as sodium sulphate solution of suitable concentration or specific gravity, the endosperms sink to the bottom of the receptacle, and the embryos float on top with consequent easy separation. We do not limit ourselves to this specific method of separation, as centrifugal force or other means which will effect the separation of the embryos from the endosperms can be employed.

It is to be noted that the kind of acid, the amount of acid, of seed and water and the degree of temperature and the length of treatment may be varied according to the character of the seed and the results desired.

Claims:

1. The herein described method of treating seeds or kernels, such as locust bean seeds, with mineral acid to loosen and soften the outer husk, then washing off the excess acid, neutralizing, then acidifying with a non-hydrolizing acid, then mechanically removing the softened husk, then allowing the de-husked seeds to stand in a dampened condition so that the endosperms swell apart to a considerable extent from the embryos, then breaking the endosperms and embryos completely apart by mechanical means, then drying the parts thus separated, then subjecting them to a milling action which will break the embryos but not the endosperms, then mechanically separating out the clean, whole endosperms from the broken embryos, thus yielding clean, de-husked separated endosperms.

2. The herein described method of treating seeds or kernels, such as locust bean seeds, with mineral acid to loosen and soften the outer husk, then washing off the excess acid, neutralizing, then mechanically removing the softened husk, then allowing the de-husked seeds to stand in a dampened condition so that the endosperms swell apart to a considerable extent from the embryos, then breaking the endosperms and embryos completely apart by mechanical means, then drying the parts thus separated, then subjecting them to a milling action which will break the embryos but not the endosperms, then mechanically separating out the clean, whole endosperms from the broken embryos, thus yielding clean, de-husked separated endosperms.

3. The herein described method of treating seeds or kernels, such as locust bean seeds, with mineral acid to loosen and soften the outer husk, then washing off the excess acid, neutralizing, then by suitable mechanical means removing the softened husk, then allowing the dehusked seeds to stand in a dampened condition so that the endosperms swell apart to a considerable extent from the embryos, then breaking the embryos and endosperms completely apart by mechanical means, then separating the endosperms from the embryos by placing the mixture in a liquid of suitable specific gravity to cause the embryos to float above the endosperms, finally separating off the layer of dehusked endosperms and drying them.

4. The herein described method of treating seeds or kernels, such as locust bean seeds, with mineral acid to loosen and soften the outer husk, then washing off the excess acid, neutralizing, then by suitable mechanical means removing the softened husk, then allowing the dehusked seeds to stand in a dampened condition so that the endosperms swell apart to a considerable extent from the embryos, then breaking the embryos and endosperms completely apart by mechanical means, then separating the endosperms from the embryos by utilizing the difference in specific gravities of the endosperms and the embryos.

VICTOR G. BLOEDE.
ELMER L. GREENSFELDER.